US012575469B2

(12) United States Patent (10) Patent No.: US 12,575,469 B2
Sandbrook (45) Date of Patent: Mar. 17, 2026

(54) DYNAMIC AGRICULTURAL WEED REMOVAL SYSTEM

(71) Applicant: Greentech Robotics Limited, Palmerston North (NZ)

(72) Inventor: Donald Sandbrook, Palmerston North (NZ)

(73) Assignee: SeedSpider Limited, Palmerston North (NZ)

( * ) Notice: Subject to any disclaimer, the term of this patent is extended or adjusted under 35 U.S.C. 154(b) by 206 days.

(21) Appl. No.: 18/063,850

(22) Filed: Dec. 9, 2022

(65) Prior Publication Data

US 2024/0188471 A1 Jun. 13, 2024

(51) Int. Cl.
*A01B 39/18* (2006.01)
*A01B 69/00* (2006.01)
(52) U.S. Cl.
CPC ............ *A01B 39/18* (2013.01); *A01B 69/001* (2013.01); *A01B 69/007* (2013.01)
(58) Field of Classification Search
CPC ..... A01B 39/18; A01B 69/001; A01B 69/007; A01B 1/16; A01B 49/022; A01B 1/08; A01B 79/005
See application file for complete search history.

(56) References Cited

U.S. PATENT DOCUMENTS 3,769,782 A 11/1973 Cler
4,663,925 A 5/1987 Terada 4,975,016 A 12/1990 Pellenc
5,442,552 A * 8/1995 Slaughter ............... G06V 10/25
701/28
9,149,927 B2 10/2015 Sturm
10,698,402 B2 6/2020 Kosa
10,980,174 B2 4/2021 Bassett
11,083,134 B2 8/2021 Bassett
(Continued)

FOREIGN PATENT DOCUMENTS

CN 101990796 A 3/2011
CN 104773225 A 7/2015
(Continued)

OTHER PUBLICATIONS

Machine Translation: EP-3610712-A1 (Year: 2020).*

(Continued)

*Primary Examiner* — Anne Marie Antonucci
*Assistant Examiner* — Connor L Knight
(74) *Attorney, Agent, or Firm* — Neustel Law Offices

(57) ABSTRACT

An agricultural weed removal method for a planted crop plant row that can include operating a weed removing implement tool on an optimized travel path for the implement tool, wherein the implement tool traverses the travel path at least partially around one or more crop plants planted in a row. The method can further include adjusting a trajectory of the travel path for the implement tool based on at least one variable. In addition, the step of adjusting the trajectory of the travel path for the implement tool may be further based on detecting the at least one variable in the travel path. Also, the detected variable may be based on least one or more sensors or cameras secured to a host vehicle. Further, the travel path may include an oscillating type pattern having a crest and a trough.

15 Claims, 6 Drawing Sheets

(56)                    References Cited

U.S. PATENT DOCUMENTS

| | | | |
|---|---|---|---|
| 11,206,764 B1 | 12/2021 | Mazor | |
| 11,246,256 B2 | 2/2022 | Snyder | |
| 11,470,781 B2 | 10/2022 | George | |
| 11,553,636 B1 * | 1/2023 | Palomares | G06V 10/764 |
| 11,968,928 B2 | 4/2024 | Gielis | |
| 2005/0126144 A1 | 6/2005 | Koselka | |
| 2006/0213167 A1 | 9/2006 | Koselka | |
| 2012/0277915 A1 | 11/2012 | Jacobsen | |
| 2012/0304610 A1 | 12/2012 | Dunn | |
| 2016/0361949 A1 * | 12/2016 | Cavender-Bares | A01B 39/12 |
| 2017/0303470 A1 | 10/2017 | Briquet-Kerestedjian | |
| 2018/0199502 A1 | 7/2018 | Briquet-Kerestedjian | |
| 2021/0022282 A1 * | 1/2021 | Wallach | A01B 63/004 |
| 2022/0172466 A1 * | 6/2022 | Snyder | G06T 7/20 |
| 2024/0074427 A1 * | 3/2024 | Tanner | A01M 7/005 |
| 2024/0196772 A1 * | 6/2024 | Ullmann | A01B 79/005 |

FOREIGN PATENT DOCUMENTS

| | | | | |
|---|---|---|---|---|
| CN | 110202540 A | 9/2019 | | |
| CN | 115251024 A | 11/2022 | | |
| EP | 3610712 A1 * | 2/2020 | | A01B 39/10 |
| IN | 201831024844 A * | 1/2020 | | |
| WO | 0049849 A1 | 8/2000 | | |
| WO | 2021112068 A1 | 6/2021 | | |

OTHER PUBLICATIONS

Non-Final Office Action Document for U.S. Appl. No. 17/393,591; Jun. 4, 2024.

U.S. Appl. No. 17/393,591, Donald Sandbrook, Applicant's non-published application.

* cited by examiner

DYNAMIC AGRICULTURAL WEED REMOVAL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

The ever-increasing cost of labor combined with the evolution of technology is making way for economically viable solutions to replace manual labor. This is particularly the case in labor intensive operations such as cropping. Cropping operations often result in the growth of undesired plants, either in the form of weeds or over planted crop plants that are then thinned to the desired spacing after germination. For these cropping operations to be successful, the undesired plants must be removed with minimum disruption to the soil and desired plants. Minimal soil disturbance is essential as dormant weed seeds in the soil can be agitated to a position where they'll germinate, exacerbating the problem. It is also important so that disturbed soil is not thrown onto desired plants, as this makes can make them difficult to wash and present as a clean product to end consumers.

Conventional mechanical "weeding" means on agricultural robots to date have typically used the same method. That method is to have two weeding implements dragged in-line with the crop plant row, one on either side from the center of the crop plant row. When the implements approach a plant, they move apart and then back in again once they pass that plant, with proximity of the implement relative to the plant being dependent on the accuracy of the machine, the plant size, and the confidence of the operator. Although a plants centroid may be determined using image processing or the like, the distance triggers for moving out and back in again around that centroid are usually configured by the operator and are set for the row/weeding session.

Some of the drawbacks with these existing mechanical weeding systems and methods are that they are mechanically demanding in that they exert high stress on various mechanical components, and further violently disrupt the soil surrounding a crop plant (or even damage the desired crop plant) due to the rapid side to side movement of the implement. This rapid movement also requires a lot of power, which is highly inefficient. Furthermore, since the weed removing implements are typically fixed in configuration, they do not account for natural variations to crop plants sizes and crop plant spacings, among other factors, which can damage larger plants and/or leave large gaps around smaller plants.

Hence, what is needed is an automated method and system for removing undesirable weeds within a crop plant row that does not disrupt the soil surrounding the crop plants, is accurate in removing undesired weeds, automatically adjusts for natural variations of the crop plants and crop plant spacing, exerts minimal wear and tear to mechanical components, and is highly energy efficient in operation.

SUMMARY

Some of the various embodiments of the present disclosure relate to an automated method and system for removing undesirable weeds within a crop plant row. In particular, the disclosed weed removal method is such that it does not disrupt the soil surrounding the crop plants, is accurate in removing undesired weeds, automatically adjusts for natural variations of the crop plants and crop plant spacing, exerts minimal wear and tear to mechanical components, and is highly energy efficient in operation, among other advantages.

In other exemplary embodiments, an agricultural weed removal method for a planted crop plant row is disclosed. The method can include operating one or more weed removing implement tools to traverse an optimized path at least partially around one or more crop plants planted in a row as a vehicle moves in a first direction, wherein the implement tools or robotic end effector arms can be further secured to the vehicle. Here, the vehicle may be any type of vehicle, such as an autonomous robot, autonomous vehicle, or any implement that can be pulled by another vehicle (such as a tractor). As discussed herein, an implement tool or implement tools can refer to any type of articulating member, articulating arm, robotic arm, gripping member, object securement member, end effector, robotic end effector arm, actuators, or any other member, component, tool, or part for removing plants or weeds from earth. The method can further include adjusting a trajectory of the travel path for one or more implement tools based at least one variable. In addition, the step of adjusting the trajectory of the travel path for the implement tool may be further based on detecting the at least one variable in the travel path. Also, the detected variable may be based on at least one or more sensors or cameras secured to a host vehicle having one or more implement tools. In addition, the detected variable may be based on at least one of a neural network model or a machine learning algorithm. Further, the travel path may include an oscillating like pattern relative to the crop plant row, having a crest and a trough. Further, the travel path may include a crested path on one side of a first crop plant followed by a linear path on an opposing side of the first crop plant, wherein the linear path is between the first crop plant and a second crop plant.

In addition, the travel path may include a crested path and a linear path on one side of a first crop plant, wherein the linear path is between the first crop plant and a second crop plant. Further, the step of adjusting the trajectory of the travel path for the one or more implement tools may be based on a varied size or shape of the one or more crop plants. Also, the step of adjusting the trajectory of the travel path for the one or more implement tools may be based on a varied distance between a first crop plant and a second crop plant.

In other exemplary embodiments, an agricultural weed removal method for a planted crop plant row is disclosed. The method can include determining a travel path for a weed removing implement tool, wherein the travel path is based on least one of a crop plant size or a distance between a plurality of crop plants planted in a row. In addition, the method can include operating the weed removing implement tool based on the pre-defined received travel path for the implement tool, wherein the implement tool traverses the travel path at least partially around the plurality of crop plants planted in a row. In addition, the method can include adjusting, automatically, a trajectory of the travel path for the implement tool based on one or more variables. Further, the step of adjusting the trajectory of the travel path for the implement tool may be based on detecting the one or more variables in the travel path. Also, the detection of the one or more variables may be based on least one or more sensors or cameras secured to a host vehicle of one or more implement tools. Further, the detection of the one or more variables may be based on at least one of a neural network model or a machine learning algorithm. In addition, the travel path may include an oscillating like pattern having a crest and a trough. Also, the travel path may include a crested path on one side of a first crop plant followed by a linear path on an opposing side of the first crop plant, wherein the linear path is between the first crop plant and a second crop plant.

In addition, the travel path may include a crested path and a linear path on one side of a first crop plant, wherein the linear path is between the first crop plant and a second crop plant. Further, the step of adjusting the trajectory of the travel path for the implement tool may be based on a varied size and/or shape of the one or more crop plants. Also, the step of adjusting the trajectory of the travel path for the implement tool may be based on a varied distance between a first crop plant and a second crop plant.

In other exemplary embodiments, an agricultural weed removal method for a planted crop plant row is disclosed. The method can include determining a travel path for a weed removing implement tool, wherein the travel path is based on least one of a crop plant size, shape or a distance between a plurality of crop plants planted in a row. In addition, the implement tool can be autonomously operated via a controller or computing device using artificial intelligence (AI) or machine learning (ML) algorithms around the plurality of crop plants planted in a row, and wherein the travel path can be an oscillating like pattern. The travel path for the implement tool may be learned via the controller through an initial training process of the AI or ML model. Further, the method can include adjusting, automatically, a trajectory of the travel path for the implement tool based one or more variables. In addition, the one or more variables are comprised at least one of: weeding implement tool size, crop plant type, crop plant size, distance between crop plants planted in a row, soil conditions, environmental conditions, weed type, weed size, or weed location.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

Figure 1:
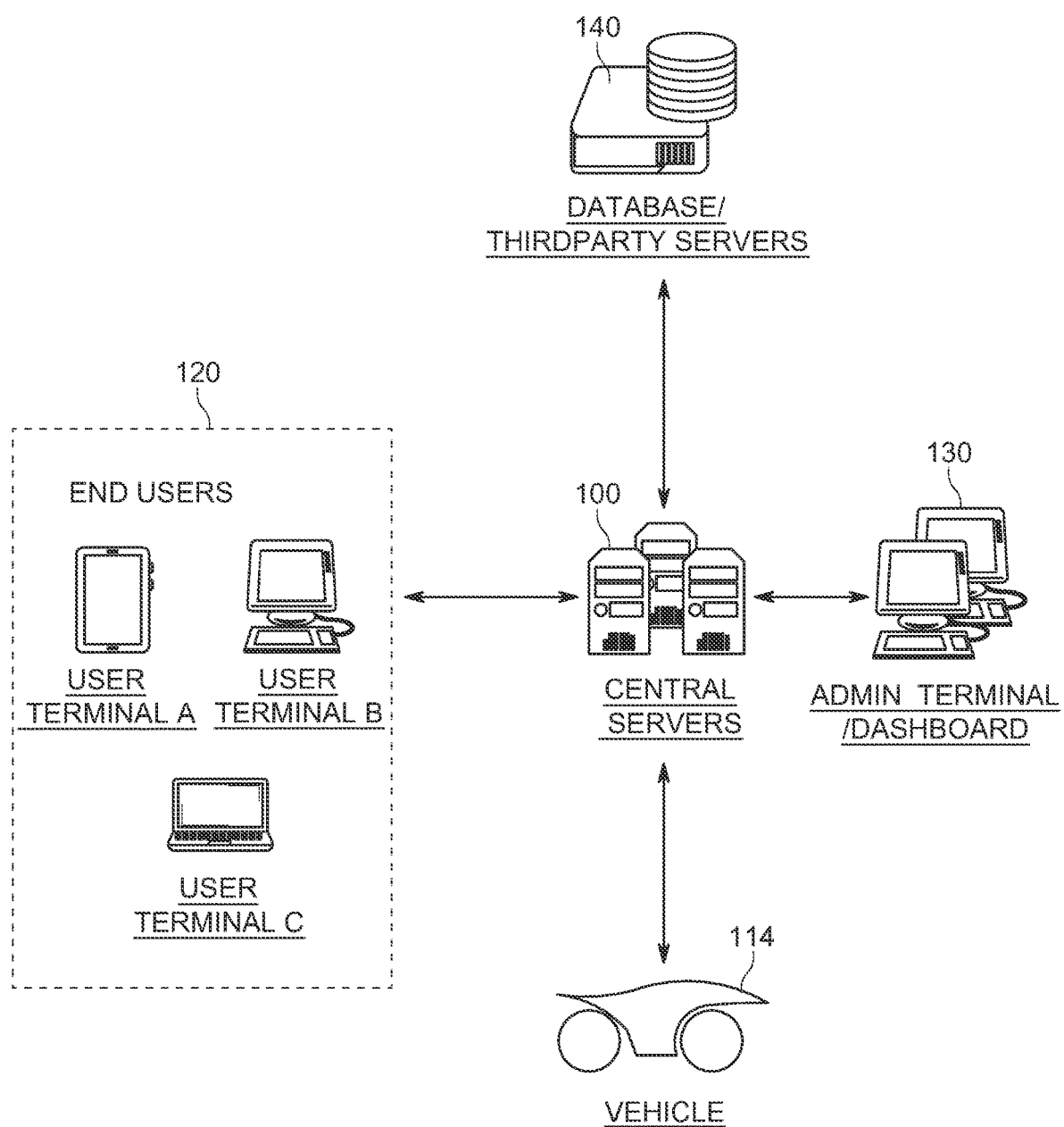
FIG. 1 illustrates a diagram for a general network architecture for the dynamic agricultural weed removal system of the disclosure described herein, according to one exemplary embodiment.

In the Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

In one implementation of the disclosure described herein, a display page may include information residing in the controller or computing device's memory, which may be transmitted from the controller or computing device over a network to a central database center and vice versa. The information may be stored in memory at each of the controller or computing device, a data storage resided at the edge of the network, or on the servers at the central database centers. A controller, computing device or mobile device may receive non-transitory computer readable media, which may contain instructions, logic, data, or code that may be stored in persistent or temporary memory of the controller or mobile device, or may somehow affect or initiate action by a controller or mobile device. Similarly, one or more servers may communicate with one or more controllers or mobile devices across a network, and may transmit computer files residing in memory. The network, for example, can include the Internet, wireless communication network, or any other network for connecting one or more mobile devices to one or more servers.

Any discussion of a controller, computing, or mobile device may also apply to any type of networked device, including but not limited to mobile devices and phones such as cellular phones (e.g., an iPhone®, Android®, or any "smart phone"), a personal computer, iPad®, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including Bluetooth®, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, features, options, and/or attributes of the disclosure described herein. For example, the portal can be a web page accessed with a web browser, mobile device application, or any application or software residing on a computing device.

FIG. 1 illustrates a diagram of a general network architecture according to one exemplary embodiment. Here, implement tools 110, end users 120 (including user terminals A, B, and C), and admin terminal/dashboard users 130 can be in bi-directional communication over a secure network with central servers or application servers 100 according to one or more embodiments. In addition, implement tools 110, users 120, and users 130 may also be in direct bi-directional communication with each other via the network system of the disclosure described herein according to one or more embodiments. Here, users can be any type of customer, operator of controllers or host vehicles for implement tools 110, manufacturer, service provider, agent, or vendor, among others, such as one or more users operating computing devices and user terminals A, B, and C in order to control operation of vehicles 110. Each of users 120 can communicate with servers 100 via their respective terminals or portals, wherein servers 100 can also operate, manage, and control any of the host vehicles or implement tools 110 of the disclosure described herein.

Still referring to FIG. 1, admin terminal/dashboard users 130 may be any type of user with access privileges for accessing a dashboard or management portal of the disclosure described herein, wherein the dashboard portal can provide various user tools, maps, graphs, crop plant information, weed information, soil information, environmental information, vehicle operation and vehicle health status, historical data, and customer support options, among others.

It is contemplated within the scope of the present disclosure described herein that any of users 120 may also access the admin terminal/dashboard 130 of the disclosure described herein.

Still referring to FIG. 1, central servers 100 of the disclosure described herein can be in further bi-directional communication with database/third party servers 140, which may also include users. Here, servers 140 can include vendors and databases where various captured, collected, or aggregated data, such as current, real-time, and past historical data, may be stored thereon and retrieved therefrom for analysis, predictions, and simulations by servers 100, such as artificial intelligence (AI), neural networks, and machine learning algorithms. However, it is contemplated within the scope of the present disclosure described herein that the dynamic agricultural weed removal system of the disclosure described herein can include any type of general network architecture.

Referring to FIGS. 1-6 the host vehicles/controllers for operating the one or more implement tools of the disclosure described herein can include any type of vehicle that includes the ability to mount one or more weed removal implement tools or apparatus'. For example, the vehicle may be a conventional farm or agricultural vehicle, such as a tractor towed vehicle or implement tool host, or it may be an autonomous, special-purpose vehicle, such as an agricultural robot designed for and dedicated to weed removal and crop plant thinning. If the latter, the vehicle may be designed with sensors, motors, and systems that enable it to navigate autonomously in a field with a desired crop plant, and also to remove weeds or other undesirable plants. For example, peripheral sensors on the vehicle or on the implement tool can scan and detect the crop plant rows to enable navigation and general movement of the vehicle. In addition, the vehicle may include a variety of systems, controllers, sensors, instruments, devices, self-contained power sources, solar cells or panels, batteries, transmitters, receivers, electronics, video and/or still cameras, lighting, etc.

In example embodiments, the vehicle can be used to mount, propel, and raise or lower actuators, or combination of actuators, with one or more implement tools attached. The vehicle may also include one or more wireless transceivers, controllers, processors, logic circuits, etc. to wirelessly receive remote control signals to control the operation of various tools, equipment, devices, control steering and drive motors to propel and direct the vehicle, and sense and wirelessly transmit data related to crop plants, weather, soil conditions, moisture, etc. to a remote data receiver.

In other example embodiments, depending on the vehicle, the vehicle may autonomously propel and direct itself, conduct weed removal operations, and communicate data to a remote receiver. Alternatively, an operator may remotely communicate commands to components of the vehicle to propel and/or direct it, and may communicate commands to and receive data from various elements of the vehicle, including instruments, measurement devices, and cropping equipment, to conduct weed removal operations and receive associated data.

In other example embodiments, peripheral sensors on the vehicle or on the implement tool scan and detect the crop plant rows, desired crop plants, and undesired weeds to enable navigation and general movement of the vehicle. For example, downward facing cameras can image the crop plant bed to generate high-resolution images. Such cameras can also sensors for detecting weeds, crop plants that require removal due to density, and desirable crop plants. Machine learning models may also use image data to detect individual plants and weeds in the soil.

Figure 2:
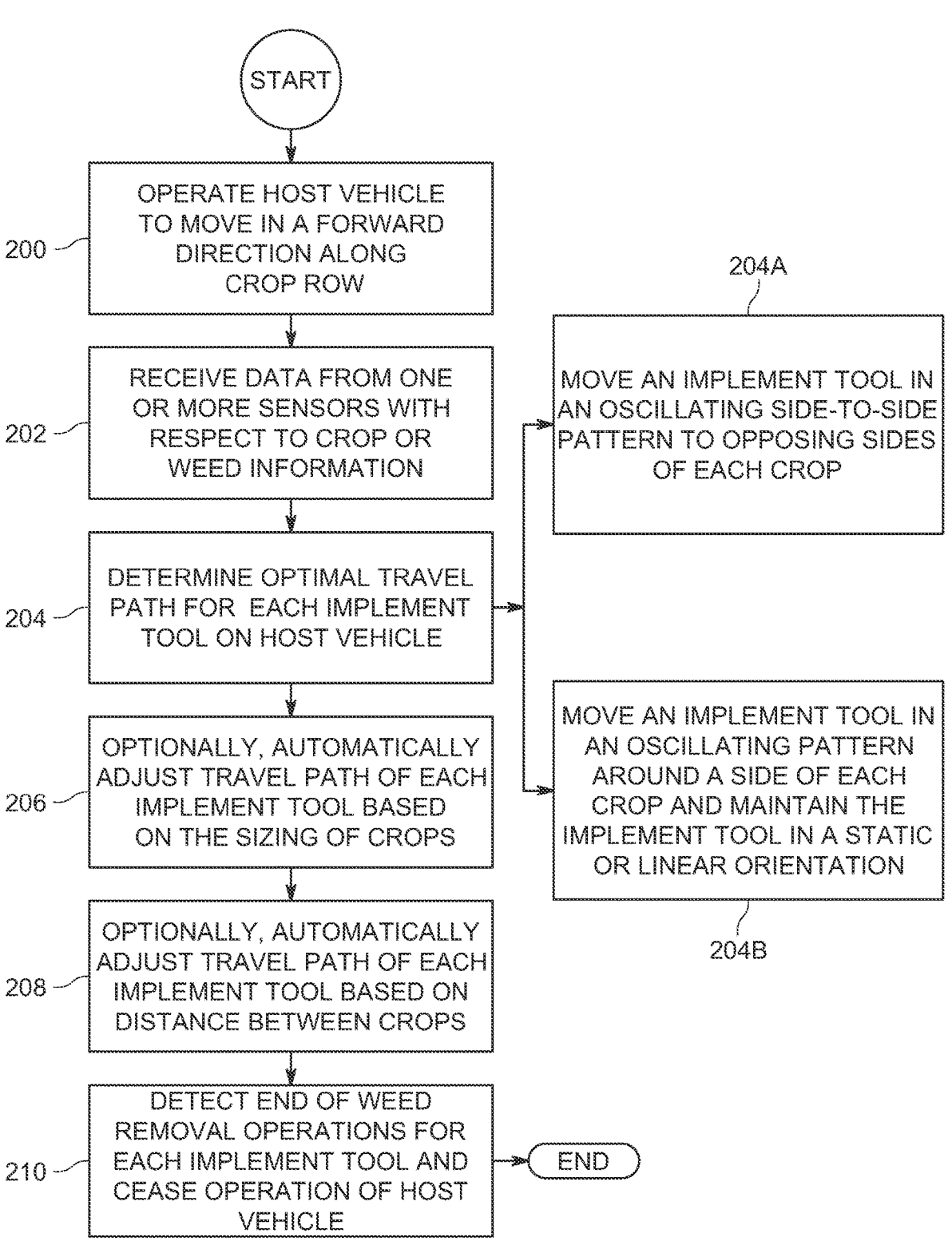
FIG. 2 illustrates a diagram of a process flow for a method of operation for the dynamic agricultural weed removal system of the disclosure described herein, according to one exemplary embodiment.
Figure 6:
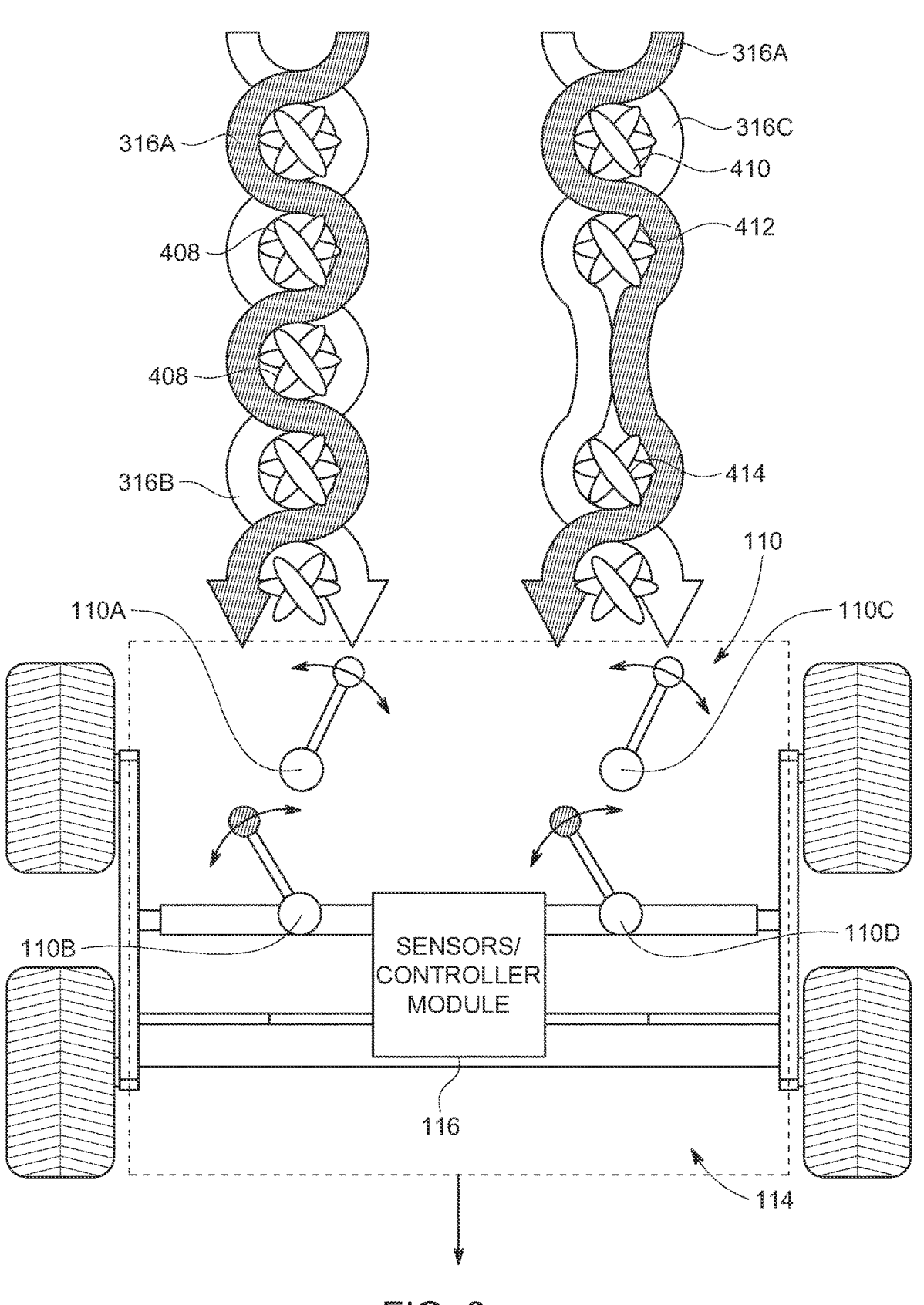
FIG. 6 illustrates a simplified top view of a host vehicle and travel paths for each implement tool along each crop plant row for the dynamic agricultural weed removal system of the disclosure described herein, according to another exemplary embodiment.

FIG. 2 illustrates a method of operation for the dynamic agricultural weed removal system of the disclosure described herein, according to one exemplary embodiment. Here, the process can begin at step 200, wherein the system or a controller can operate one or more host vehicles (having one or more implement tools secured thereto) in a forward direction along a crop plant row, such as shown in FIG. 6, crop plants. Here, a controller for each implement tool of the host vehicle may be able to determine minimum and maximum values for the type of oscillating travel path pattern, peak and trough distances, the spacing between each peak and trough (e.g., frequency), type of crop plant, crop plant size, weed size, weed location, operational duration, implement tool size, and the like. Next, at step 202, the system or controller can receive data from one or more sensors on the host vehicle or each implement tool to identify various parameters for the operation of each implement tool, such as information pertaining to soil or environmental conditions, type of crop plant, crop plant size, weed size, and weed location, among others.

Still referring to FIG. 2, at step 204, the system or controller for each implement tool of the host vehicle can determine an optimal travel path for each implement tool in order to effectively and efficiently remove undesirable weeds that are located in and around desirable crop plants and without disturbing the desirable crop plants or soil around them. Once the desired travel path of each implement tool is determined, the system or controller can then operate each implement tool in that determined travel path, such as shown with respect to FIGS. 1-6. Here, as the host vehicle moves in a forward direction along one or more crop plant rows, each implement tool on the host vehicle will operate in its determined travel path (or automatically adjust its travel path based on information from sensors and/or via an AI or ML model) in order to remove any and all weeds within the travel path of the implements without disturbing the desirable crop plants or the soil surrounding the desirable crop plants, such as shown in FIGS. 1-6. Referring to step 204A, in one exemplary embodiment, the system or controller can move an implement tool in an oscillating side-to-side pattern to opposing sides of each crop plant within a row, such as shown in FIGS. 3A-3C and FIG. 6. Referring to step 204B, in another exemplary embodiment, the system or controller can also move an implement tool in an oscillating pattern around a side of each crop plant and then maintain the implement tool in a static or linear orientation for a period of time, such as shown in FIGS. 4C, 5A, and 6.

Still referring to FIG. 2, at step 206, the system or controller may also automatically and dynamically adjust each implement tool's travel paths based on the sizing of the crop plants (FIG. 3C), the type of weeds, the number of weeds, crop plant size anomaly's (FIG. 3C), its position relative to another weed removing implement tool (FIGS. 3B-5B), soil conditions, the size of the tool, and the like. Similarly, at step 208, the system or controller may also automatically and dynamically adjust each implement tool's travel paths based on the spacing or distance between each crop plant within a crop plant row, such as shown in FIG. 6. For example, the system or controller may automatically modify an implement tool's oscillating travel path by increasing the frequency at which the implement tool moves between each crop plant, such as shown in FIG. 4B. Alternatively, the system or controller may automatically modify an implement tools oscillating travel path by using a combined oscillating and effective linear travel path pattern, such as shown FIG. 4C and FIG. 6.

Figure 5A:
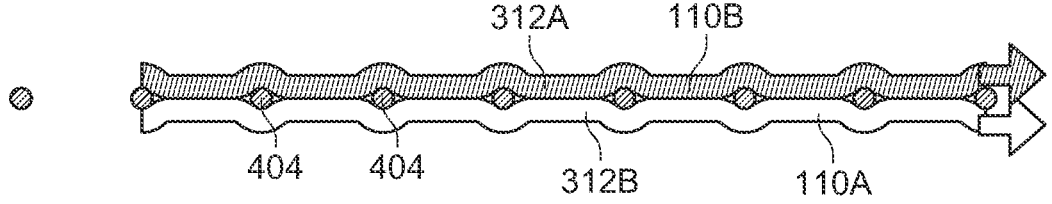
FIG. 5A illustrates another diagram of travel paths for at least two implement tools around a crop plant for the dynamic agricultural weed removal system of the disclosure described herein, according to another exemplary embodiment.
Figure 5B:
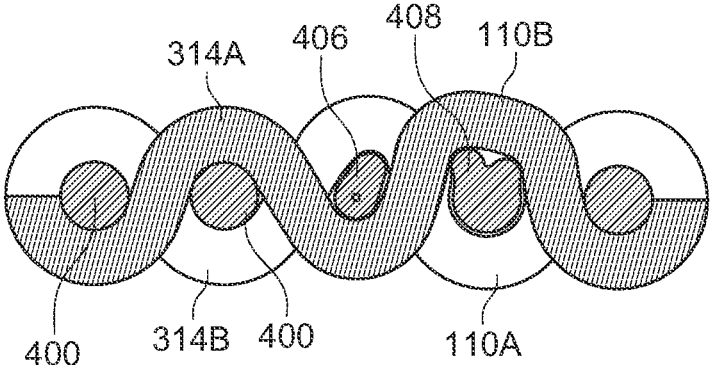
FIG. 5B illustrates another diagram of travel paths for at least two implement tools around a crop plant for the dynamic agricultural weed removal system of the disclosure described herein, according to another exemplary embodiment.

Still referring to FIG. 2, alternatively, the system or controller may automatically modify an implement tool's oscillating travel path by implementing a combined half oscillating and half linear pattern (i.e., moving in a travel path along one side of a crop plant row), such as shown in FIG. 5A. Alternatively, the system or controller may automatically modify a travel paths curvature to an irregular path for an implement tool based on asymmetrical shaping of a crop plant, such as shown in FIG. 5B. At step 210, once the vehicle reaches the end of a crop plant row (such as via sensors on the host vehicle or implement tools detecting the end of the crop plant row or no additional weeds in the vehicle or implement tools path), then each implement tool on the host vehicle may cease weed removal operations. Alternatively, the host vehicle may traverse the same travel path back (such as in a reverse direction) and re-scan the areas around the crop plants in the crop plant row for any missed weeds. Here, with respect to any of steps 200-210, any type of cameras or sensors on the host vehicle or implement tools in combination with an AI or ML learning algorithm model (and historical data) disclosed herein may allow the system or controller of each implement tool to dynamically adjust each implement tool's travel path or pattern, distance, duration, speed, heading, and/or trajectory, among other factors.

Figure 3A:
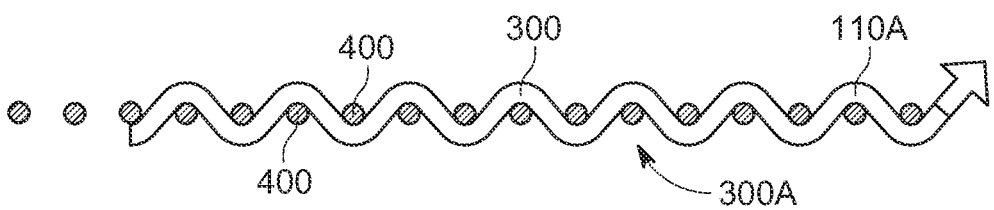
FIG. 3A illustrates a diagram of a travel path for an implement tool around a crop plant for the dynamic agricultural weed removal system of the disclosure described herein, according to one exemplary embodiment.

FIG. 3A illustrates one example embodiment of an oscillating travel path 300 for a single implement tool 110A of the disclosure described herein moving around each crop plant 400 planted within a crop plant row in order to remove undesired weeds as a host vehicle moves in a forward direction. In general, the travel paths shown in FIGS. 3A-6 for "weeding" down a crop plant row is that of any implement tools 110A-110D oscillating from side to side of the desired crop plant or plant. Here, this oscillating pattern (or hybrid oscillating and linear pattern) allows for a gentler movement, less mechanical stress on components, and less soil disturbance relative to conventional weed removal systems. As shown in FIGS. 3A-6, even though the travel paths of each implement tool is shown to be continuous, it should be appreciated that this is the path with the implement tool actively operating to remove weeds from within the soil. Further, the weed removal apparatus of each host vehicle (such as a robotic arm with an implement tool attached thereto) may be raised or lowered as required by each vehicle's management or controller system to only target undesirable weeds, or, in the case of thinning, undesirable plants.

In addition, a host vehicle may only be required to operate their respective robotic arms (or any weed removal component or implement tool) on an as needed basis in order to further reduce undesired soil disturbance. In addition, the oscillating travel paths of each implement tool mounted to a host vehicle can be determined by factors such as the implement tool size, plant spacing, plant size, and the effective width of the vehicle. Further, the travel path may be triangular, parabolic, sinusoidal, cubic, irregular, or defined by any other similar oscillating waveform function or any combination thereof in order to achieve close proximity when moving from one side of the crop plant row to the other.

Referring back to FIG. 3A, it can be seen here that implement tool 110A can get close to each crop plant 400 on one side but unable to tend to areas 300A on another side of the crop plant while active on path 300 as a host vehicle moves in a forward direction. Here, these unattended areas 300A could be covered by a second pass of the same implement tool 110A targeting the opposing area 300A of the first path, such as an inversion of the first oscillating path 300.

Figure 3B:
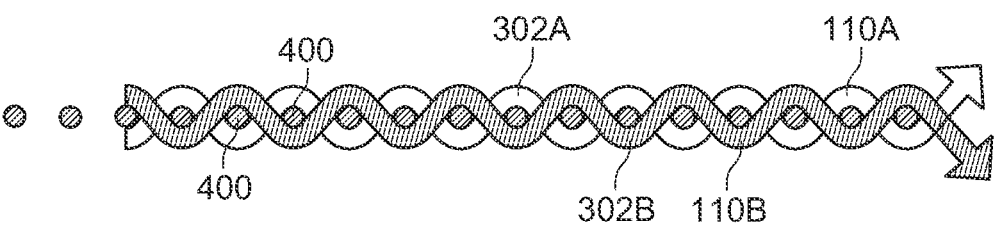
FIG. 3B illustrates another diagram of travel paths for at least two implement tools around a crop plant for the dynamic agricultural weed removal system of the disclosure described herein, according to another exemplary embodiment.

FIG. 3B illustrates another example embodiment of oscillating travel paths 302A and 302B for each implement tool 110A and 110B of the disclosure described herein moving around each crop plant 400 planted within a crop plant row in order to remove undesired weeds as a host vehicle moves in a forward direction. As shown, one travel path can be an inversion of the other. In particular, the embodiment of FIG. 4B allows for two independent implement tools to simultaneously travel around each crop plant 400 along an optimized (or dynamically adjustable) oscillating pattern, thereby covering both sides of each crop plant 400. Further, each implement tool may be spaced apart from another implement tool in order to prevent a collision with each other in the area between each crop plant where they cross paths, such as shown in FIG. 6. For example, one implement tool may be disposed or secured in front of another implement tool during active weed removing operations, such as shown in FIG. 6. In other embodiments, cameras and proximity sensors may be implemented on the host vehicle in order to avoid any type of collision, such as each implement tool moving in a rotating or oscillating pattern based on different timings (or in sync or out of sync) with respect to each other.

Still referring to FIG. 3B, it can be seen that the coverage area surrounding each crop plant 400 is very effective. However, this is shown in an ideal situation where there is even plant sizing and spacing. With current image recognition (or other plant identifying software) it is contemplated within the scope of the disclosure for the system or a controller to obtain crop plant properties such as the plant size, shape, centroid, and spacing, among others, and use such data to modify the travel path of each implement tool as needed. In particular, to further increase effectiveness, it is preferable that the function or functions defining the oscillation of each implement tool are dynamic to allow for natural variations or imperfections in the crop, such as disclosed with respect to FIG. 3C. Further, it is also contemplated within the scope of the disclosure described herein that the function or functions of the second implement tool 110B (or additional implement tools) can be independently optimized by management software or a controller and not simply mirror the travel path of the first implement tool 110A. In example embodiments, each host vehicle can independently raise and lower each implement tool (or operate any weed removal component) as required to target weeds, as well as having a travel path that is optimized for proximity to the desired plant or operating near the desired plant.

Figure 3C:
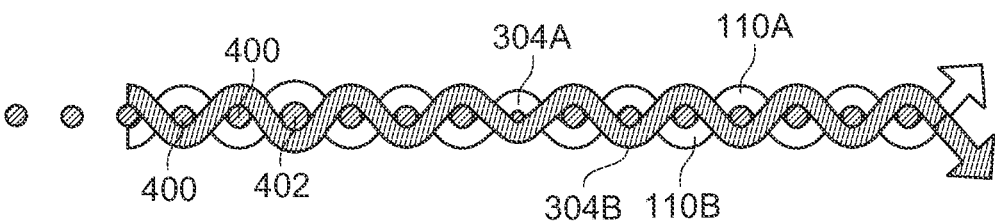
FIG. 3C illustrates another diagram of travel paths for at least two implement tools around a crop plant for the dynamic agricultural weed removal system of the disclosure described herein, according to another exemplary embodiment.

FIG. 3C illustrates another example embodiment of oscillating travel paths 304A and 304B for each implement tool 110A and 110B of the disclosure described herein moving around each crop plant 400 planted within a crop plant row in order to remove undesirable weeds as a host vehicle moves in a forward direction. Here, the embodiment of FIG. 4C illustrates a crop plant 402 having a size variation relative to the other crop plants 400 in the crop plant row, namely, being of a larger size relative to crop plants 400. Accordingly, implement tools 110A and 110B can automatically and dynamically adjust their travel paths to accommodate for the larger size of crop plant 402 and the larger soil area (and not damage the crop plant, its roots, or surrounding soil) relative to other crop plants 400. In other embodiments, implement tools 110A and 110B can dynamically adjust to other variables, such as uneven crop plant spacing or lopsided plant growth. Here, the scenario of lopsided plant growth highlights the benefit of having independent but complimentary implement tool travel paths, with each implement tool path optimized for its side within the crop plant row for traversing around the crop plant. It is contemplated within the scope of the present disclosure described herein that to optimize the travel paths or patterns of each implement tool for any particular application, a specific or customized implement tool may be used to obtain the best weeding coverage between crop plants along a crop plant row for that specific application. However, it is also beneficial to utilize the same specific or customized implement tool to reduce down-time with setup and to stay within operational parameters of the motors and actuators.

Figure 4A:
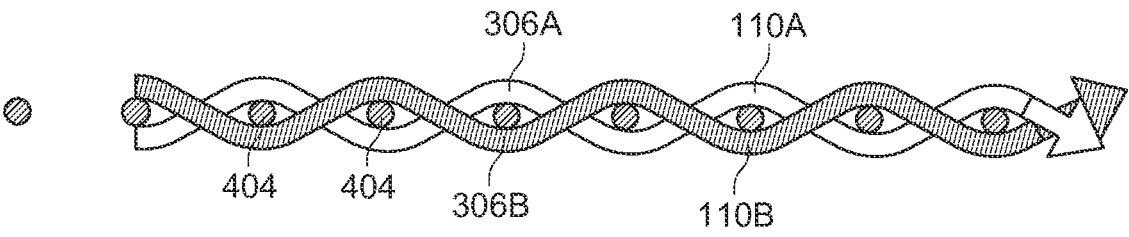
FIG. 4A illustrates another diagram of travel paths for at least two implement tools around a crop plant for the dynamic agricultural weed removal system of the disclosure described herein, according to another exemplary embodiment.
Figure 4B:
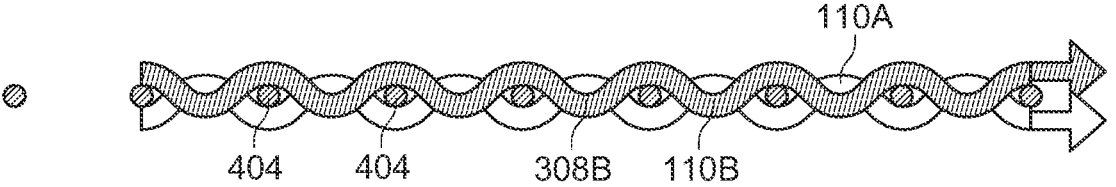
FIG. 4B illustrates another diagram of travel paths for at least two implement tools around a crop plant for the dynamic agricultural weed removal system of the disclosure described herein, according to another exemplary embodiment.
Figure 4C:
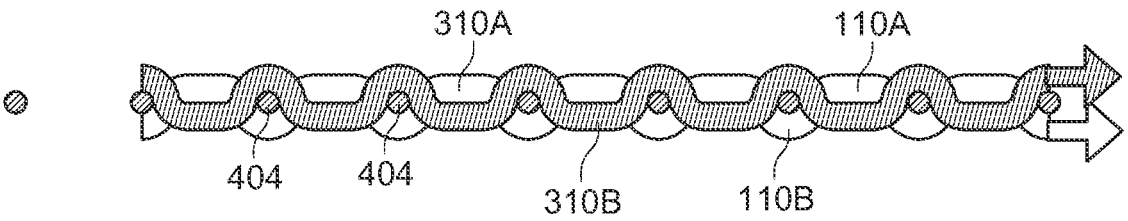
FIG. 4C illustrates another diagram of travel paths for at least two implement tools around a crop plant for the dynamic agricultural weed removal system of the disclosure described herein, according to another exemplary embodiment.

FIG. 4A illustrates another example embodiment of oscillating travel paths 306A and 306B for each implement tool 110A and 110B of the disclosure described herein moving around each crop plant 404 planted within a crop plant row in order to remove undesirable weeds as a host vehicle moves in a forward direction. In particular, FIGS. 4A-5A illustrate scenarios where the crop plant size is the same as crop plants 400 of FIGS. 3A-3C, but with the crop plant spacing of crop plants 404 doubled relative to crop plants 400. Accordingly, as shown in FIG. 4A, each implement tool 110A and 110B can dynamically adjust their travel paths (i.e., lower frequency) in order to accommodate for the larger spacing or distance between each crop plant 404.

FIG. 4B illustrates another example embodiment of oscillating travel paths 308A and 308B for each implement tool of the disclosure described herein moving around each crop plant 404 planted within a crop plant row in order to remove undesirable weeds as a host vehicle moves in a forward direction. In the embodiment of FIG. 4B, each implement tool 110A and 110B can increase its respective oscillating travel paths 308A and 308B such that they make additional peak or trough passes in between each crop plant 404 (i.e., higher frequency), relative to travel paths 306A and 306B of FIG. 4A. Accordingly, the embodiment of FIG. 4B can result in the implement tools moving in a travel path that is closer in proximity to the crop plants and are able to traverse a larger area (and open spaces) in order to minimize missed weeds. Further, the number of oscillations between plants (i.e., frequency) could be optimized to suit the size of each implement tool and plant spacing.

FIG. 4C illustrates another example embodiment of oscillating travel paths 310A and 310B for each implement tool 110A and 110B of the disclosure described herein moving around each crop plant 404 planted within a crop plant row in order to remove undesirable weeds as a host vehicle moves in a forward direction. In the embodiment of FIG. 4C, to further maximize the benefits of the travel paths 306A and 306B of FIG. 4B, a reduced "amplitude" (or side to side distance, or average travel path width) between plants can be utilized. Specifically, each travel path may have an oscillating type wave around crop plant 404 that is then followed by a linear or flat trajectory (or maintaining an implement tool in a static orientation for a determined period of time), wherein the linear or flat trajectory covers the space in between each crop plant 404, such as also in FIG. 6.

FIG. 5A illustrates another example embodiment of oscillating travel paths 312A and 312B for each implement tool 110A and 110B of the disclosure described herein moving around each crop plant 404 planted within a crop plant row in order to remove undesirable weeds as a host vehicle moves in a forward direction. In the embodiment of FIG. 5A, each implement tool 110A and 110B also has a partial oscillating wave followed by a linear trajectory similar to that of paths 310A and 310B of FIG. 4C; however, in this embodiment, each implement tool 110A and 110B can operate and traverse its respective path 312A and 312B on its own side of the crop plant row and not cross paths with the opposing implement tool.

FIG. 5B illustrates another example embodiment of oscillating travel paths 314A and 314B for each implement tool 110A and 110B of the disclosure described herein moving around crop plants 400, 406, and 408 planted within a crop plant row in order to remove undesirable weeds as a host vehicle moves in a forward direction. In the embodiment of FIG. 5B, each implement tool 110A and 110B can dynamically adjust and alter its oscillating travel path to an irregular travel path based on irregular or asymmetrical shaped crop plants within its path, such as irregular shaped crop plants 406 and 408 (relative to crop plants 400).

FIG. 6 illustrates one exemplary embodiment of a host vehicle 114 having multiple implement tools 110 secured thereto and moving in a forward direction along at least two crop plant rows in order to remove undesirable weeds along the crop plant row. In particular, one side of the host vehicle 114 may include implement tools 110A and 110B for removing weeds along one crop plant row and another side of the host vehicle 114 may include implement tools 110C and 110D for removing weeds along another adjacent crop plant row, wherein each crop plant row may have variations in size, spacing, or shape with respect to each crop plant. As shown in FIG. 6, in one exemplary method of operation, each implement 110A-110D can operate independently of each other and modify its travel around each crop plant in the crop plant row. For example, as host vehicle 114 moves in a forward direction, implements 110A and 110B can follow travel paths 316A and 316B, respectively, in an oscillating side-to-side pattern around each crop plant 408 along the crop plant row in order to remove undesirable weeds. Further, implements 110C and 110D can also move in travel paths 316C and 316D, respectively, in an oscillating side-to-side pattern around crop plant 410, but also dynamically adjust their travel path to a linear formation between crop plants 412 and 414 in order to accommodate for the additional spacing between crop plants 412 and 414. Further, as shown in FIG. 6, host vehicle 114 may include sensors/controller module 116 that can include various sensors and controllers as previously disclosed herein. Further, module 116 may also include one or more communication ports, outlets, or interfaces for receiving power (such as for charging) and communicating with one or computing devices, either via a wired connection or wirelessly via a network, among other features.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. An agricultural weed removal method for a planted crop plant row, comprising:

operating a weed removing tool that is rotatably coupled to a vehicle based on a travel path for the weed removing tool that includes a singular, continuous oscillating crest and trough pattern, wherein a forward motion of the vehicle and the travel path causes the weed removing tool to execute the singular, continuous oscillating crest and trough pattern by continuously moving from a trough at a side of a first crop plant to a crest at an opposing side of a second crop plant via a diagonal motion across a central axis of a row in which the first crop plant is planted immediately preceding the second crop plant; and adjusting a trajectory of the travel path for the weed removing tool based on at least one variable.

2. The agricultural weed removal method of claim 1, wherein the step of adjusting the trajectory of the travel path for the weed removing tool is further based on detecting the at least one variable in the travel path.

3. The agricultural weed removal method of claim 2, wherein the detected at least one variable is based on one or more sensors or one or more cameras secured to the vehicle or the weed removing tool.

4. The agricultural weed removal method of claim 2, wherein the detected at least one variable is based on at least one of a neural network model or at least one of a machine learning algorithm.

5. The agricultural weed removal method of claim 1, wherein the travel path is comprised of the crest on the side of the first crop plant followed by a linear path extending from the trough on the opposing side of the second crop plant, wherein the linear path is between the second crop plant and a third crop plant planted along the central axis of the row in a location immediately following the second crop plant.

6. The agricultural weed removal method of claim 1, wherein the step of adjusting the trajectory of the travel path for the weed removing tool is based on a varied size and/or shape of one or both of the first crop plant and the second crop plant.

7. The agricultural weed removal method of claim 1, wherein the step of adjusting the trajectory of the travel path for the weed removing tool is based on a varied distance between the first crop plant and the second crop plant.

8. An agricultural weed removal method for a planted crop plant row, comprising:

determining a travel path for a weed removing implement tool with respect to a plurality of crop plants planted along a central axis of a row, wherein the travel path includes a singular, continuous oscillating crest and trough pattern and is based on least one of a crop plant size or a distance between the plurality of crop plants planted in the row;

operating the weed removing implement tool based on the travel path for the weed removing implement tool, wherein a forward motion of the weed removing implement tool and the travel path causes the weed removing implement tool to execute the singular, continuous oscillating crest and trough pattern by continuously moving from a trough at a side of a first crop plant to a crest at an opposing side of a second crop plant via a diagonal motion across a central axis of a row in which the first crop plant is planted immediately preceding the second crop plant; and adjusting, automatically, a trajectory of the travel path for the weed removing implement tool based on one or more variables.

9. The agricultural weed removal method of claim 8, wherein the step of adjusting the trajectory of the travel path for the weed removing implement tool is based on detecting the one or more variables in the travel path.

10. The agricultural weed removal method of claim 9, wherein the detection of the one or more variables is based on one or more sensors or one or more cameras secured to the weed removing implement tool or a vehicle comprising the weed removing implement tool.

11. The agricultural weed removal method of claim 9, wherein the detection of the one or more variables is based on at least one of a neural network model or at least one of a machine learning algorithm.

12. The agricultural weed removal method of claim 8, wherein the travel path is comprised of the crest on the side of the first crop plant followed by a linear path extending from the trough on the opposing side of the second crop plant, wherein the linear path is between the second crop plant and a third crop plant planted along the central axis the row in a location immediately following the second crop plant.

13. The agricultural weed removal method of claim 8, wherein the step of adjusting the trajectory of the travel path for the weed removing implement tool is based on a varied size and/or shape of one or both of the first crop plant and the second crop plant.

14. The agricultural weed removal method of claim 8, wherein the step of adjusting the trajectory of the travel path for the weed removing implement tool is based on a varied distance between the first crop plant and the second crop plant planted in the row.

15. An agricultural weed removal method for a planted crop plant row, comprising:

determining a travel path for a weed removing tool with respect to a plurality of crop plants planted along a central axis of a row including a first crop plant immediately preceding a second crop plant, wherein the travel path is based on at least one of a crop plant size or a distance between the plurality of crop plants planted in the row;

operating the weed removing tool based on the travel path for the weed removing tool, wherein a forward motion of the weed removing implement tool and the travel path causes the weed removing implement tool to execute the singular, continuous oscillating crest and trough pattern by continuously moving from a trough at a side of a first crop plant to a crest at an opposing side of a second crop plant via a diagonal motion across a central axis of a row in which the first crop plant is planted immediately preceding the second crop plant; and adjusting, automatically, a trajectory of the travel path for the weed removing tool based on two or more variables comprised of: crop plant type, crop plant size, distance between crop plants planted in the row, soil conditions, environmental conditions, weed type, weed size or weed location.

* * * * *